C. F. LAUN.
EXTENSION ROD AND BRACKET.
APPLICATION FILED JULY 9, 1915.
1,201,834.
Patented Oct. 17, 1916.
2 SHEETS—SHEET 1.
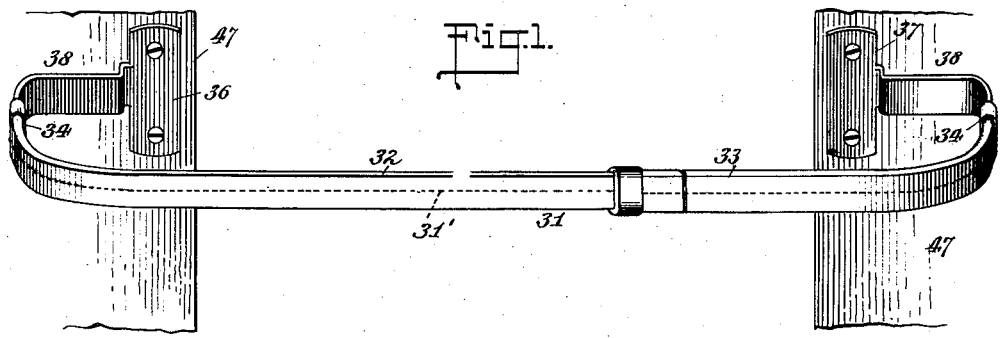
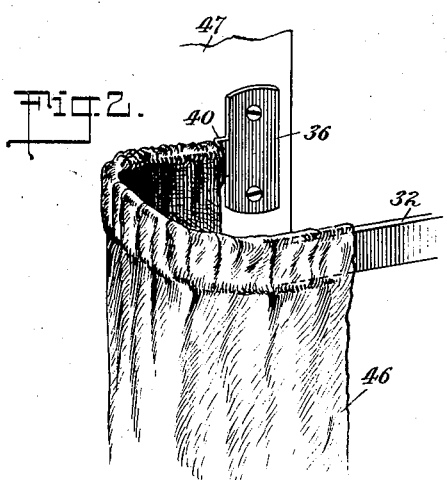
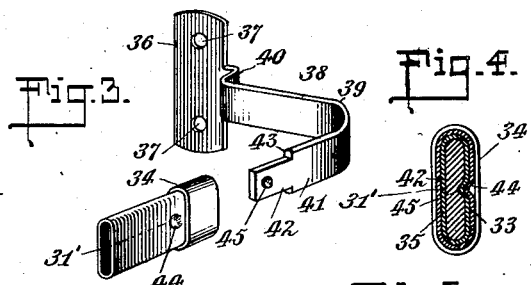
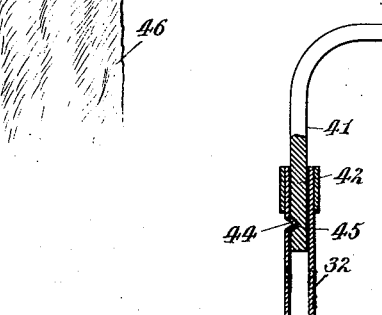
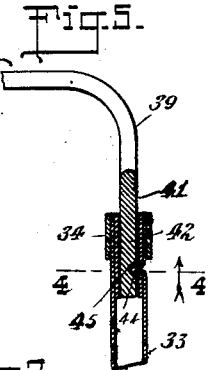
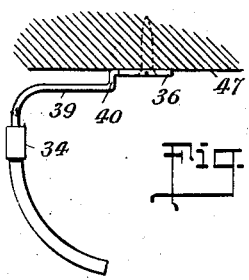
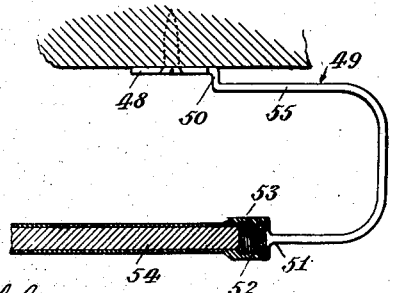
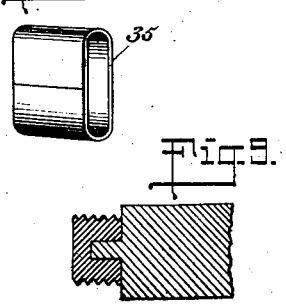
WITNESSES
INVENTOR
BY
ATTORNEYS C. F. LAUN.
EXTENSION ROD AND BRACKET.
APPLICATION FILED JULY 9, 1915.
1,201,834.
Patented Oct. 17, 1916.
2 SHEETS—SHEET 2.
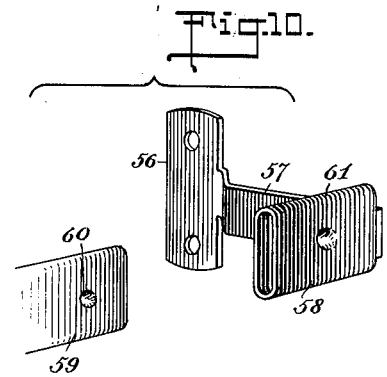
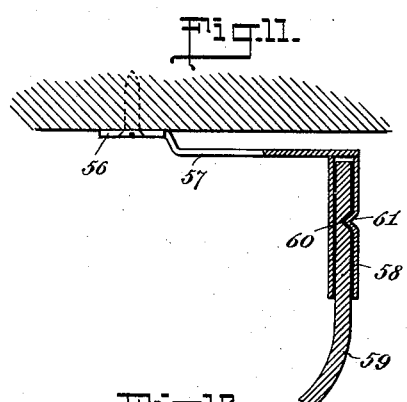
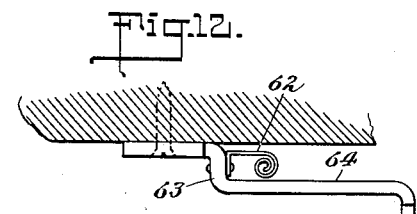
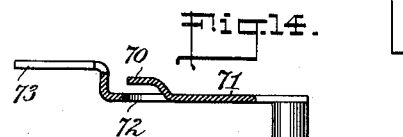
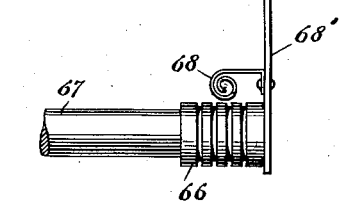
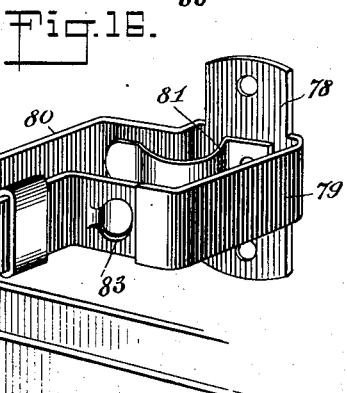
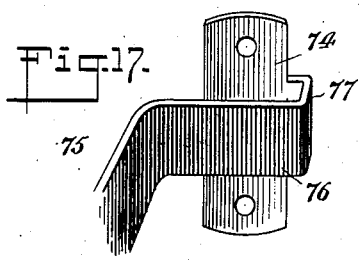
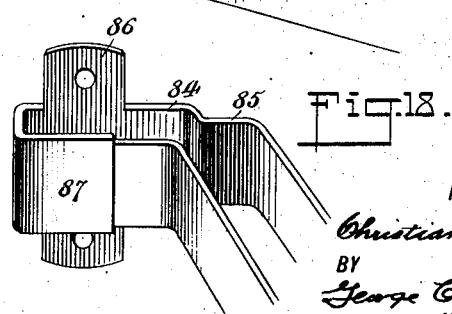
WITNESSES
INVENTOR
Christian F. Laun
BY
George Cook + Sons
ATTORNEYS

UNITED STATES PATENT OFFICE.

CHRISTIAN F. LAUN, OF WATERVILLE, CONNECTICUT, ASSIGNOR TO BERBECKER & ROWLAND MANUFACTURING COMPANY, OF WATERVILLE, CONNECTICUT, A CORPORATION OF CONNECTICUT.

EXTENSION-ROD AND BRACKET.

1,201,834.  Specification of Letters Patent.  Patented Oct. 17, 1916.

Application filed July 9, 1915. Serial No. 38,922.

*To all whom it may concern:*

Be it known that I, CHRISTIAN F. LAUN, a citizen of the United States, and a resident of Waterville, in the county of New Haven and State of Connecticut, have made and invented certain new and useful Improvements in Extension-Rods and Brackets, of which the following is a specification.

This invention relates to extension rods and brackets, such as are used for the support of curtains, draperies, etc.

An object of the present invention is to so construct a curtain rod, having return bends at the ends thereof, that a clamping action upon the curtains or draperies will be obtained, and thus hold them in proper position and prevent their shifting along the rod.

A further object is to provide a bracket for the support of extension rods, which is provided with curtain clamping means adapted to engage and retain a curtain in proper position, the means being of such design and arrangement that there is little or no likelihood of the curtains or draperies becoming torn or mutilated by reason of the clamping or retaining member.

A further object is to provide a curtain rod composed of telescopic members, the outer or free extremities of which are of the same dimensions, so that a uniform size of bracket may be employed, and the extension rod is thus rendered reversible.

A further object is to provide improved means for securing the extension rod to the brackets, the construction being of an economical nature, and at the same time providing for the rigid and fixed securement of the extension rod to the brackets.

A further object is to provide a curtain rod composed of oval or flat, hollow cross-section, wherein the tubes are formed from a single piece of metal so bent as to be completely closed, and with a seam extending along the middle line of the rear side of the tube, thus presenting a smooth and unobstructed surface and providing for the smooth shirring of the curtain along the rod, as well as imparting a high degree of strength thereto.

With these and other ends in view, which will appear as the description proceeds, the invention resides in the combination of parts and details of construction hereinafter described and claimed, it being understood that changes in the precise embodiment of the invention can be made within the scope of what is claimed without departing from the spirit thereof.

The preferred embodiment of my invention is disclosed in the accompanying drawings, wherein:—

Figure 1 is a view in perspective of an extension rod and supporting brackets embodying the characteristic features of my invention; Fig. 2 is a fragmental view of the above, and illustrating the manner in which the curtain or drapery is supported thereon, and retained in its proper position; Fig. 3 is a view in perspective of one end of the extension rod and the supporting bracket therefor, illustrating in detail the manner in which the securement is effected therebetween; Fig. 4 is a cross-sectional view taken on the line 4—4 of Fig. 5; Fig. 5 is a top plan view, partially in section, of portions of the supporting bracket and the adjoining ends of the extension rod; Fig. 6 is a top plan view of a supporting bracket and the adjacent end of the extension rod; Fig. 7 is a view in perspective of the ferrule or sleeve which is inserted within the exposed end of the larger rod, so that it becomes equal in internal diameter to that of the smaller rod, and a standard size of bracket may accordingly be utilized; Fig. 8 is a top plan view, and partially in section, of a curtain rod of the non-extensible type, and a supporting bracket therefor; Fig. 9 is a detailed view in front elevation of the free extremity of the bracket for use in connection with the foregoing; Fig. 10 is a view in perspective of a somewhat modified form of connection between the supporting bracket and extremity of the extension rod, in this case, the bracket receiving the extremity of the rod therein, rather than fitting within the extension extremity, as in the above-mentioned forms; Fig. 11 is a view in section of the foregoing; Fig. 12 is a view in top plan of a supporting bracket having an auxiliary clamping or retention member adapted to engage and hold the curtains or draperies; Fig. 13 is a similar view of a somewhat modified form of bracket adapted for use with non-extensible rods, the bracket being provided with a curtain clamping member; Fig. 14 is a view in top plan, and partially in section, of a rod supporting bracket wherein the auxiliary clamping member is stamped directly from the body metal of the bracket; Fig. 15 is a view in front elevation of the foregoing; Fig. 16 is a detailed view in perspective of a supporting bracket for two curtain rods; Fig. 17 is a view in perspective of a further modified form of supporting bracket, wherein provision is made for the crowding and clamping of the curtain between the arm of the bracket and the base; Fig. 18 is a supporting bracket similar to the foregoing but adapted to support two curtain rods.

Referring specifically to the several views, the curtain rod 31 is of the extension type and includes the telescoping members 32 and 33, the inner member 32 being somewhat smaller and adapted to slide within the outer member 33. The remote extremities of these members are preferably reinforced by the sleeves or ferrules 34, while a lining member 35, illustrated in detail in Fig. 7, is positioned within the extremity of the outer member 32. The extension rod is accordingly provided with similar ends and thus requires but one size of supporting bracket therefor, rendering the rod reversible end for end, and eliminating what are known as right and left brackets.

Referring particularly to Fig. 3, it will be observed that the bracket, as therein illustrated, is formed with the base 36, in which are provided suitable openings 37, adapted to accommodate or support screws or analogous means whereby the bracket may be rigidly secured to a sash or other supporting structure. Projecting from one edge of the base, and preferably central thereof, is a supporting arm 38, the configuration thereof being clearly illustrated in Figs. 2, 3 and 6. The arm includes the offset body 39, secured at its one end to the base by the bend 40, and with the other end reversely bent to form the attaching portion 41. The outer end of the attaching portion 41 extends approximately perpendicular to the base 36, and is provided with the reduced extremity 42, the reduction in width of which defines the shoulders 43, and against which the ends of the extension rod are adapted to abut. The extremities 42 of the bracket, as thus constructed, are adapted to fit snugly, and somewhat tightly, within the ends of the extension curtain rod 31, and rigidly support the same. In order to prevent the accidental detachment or separation of the rod from the brackets, the extremities of the former are provided with the inwardly extending projections or lugs 44, and the extremities 42 of the brackets are provided with corresponding dents or recesses 45, into which the said projections are adapted to fit, and having once snapped therein, prevent the separation of the parts, as mentioned.

Particular attention is called to Fig. 2, wherein the support of the curtain is illustrated, and from which it will be apparent that the curtain or drapery 46 extends entirely around the bend at the end of the rod, over the body portion 39 of the bracket, and up to the offset bend 40 therein. The offset 40 is of a limited nature so that the body 39 extends close to the support upon which the bracket is secured. The body 39, thus forms and constitutes a resilient clamping member between which and the adjacent surface of the wall or support 47, the curtain is crowded or wedged, thus preventing the displacement or shifting of the curtain along the rod, and at the same time the raw edge of the curtain is completely hidden.

Particular attention is called to the fact that flat or oval-shaped curtain rods, as heretofore constructed, do not include a continuous surface along the back of the tubes, it having been customary to merely provide fingers extending over and forming the rear side of the tubes, or providing a slight over-hanging bead over the edges of the tubes. With such construction, the fingers or beaded edge interfered with the shirring of the curtain on the rod, and sometimes resulted in the tearing thereof. As will be particularly noted in Figs. 1, 3 and 4, I form the flat, hollow curtain rod with tubes which are completely closed, the portions of the back of the tubes being bent so as to contact and form the seam 31' extending along the rear surface of the tubes. This closed portion of the flat or oval-shaped hollow tubes adds materially to the strength thereof, and also presents a smooth and unobstructed rear surface, allowing the curtain or draperies to be easily and smoothly moved therealong.

The somewhat modified form of bracket illustrated in Figs. 8 and 9, is adapted to support rods which are not extensible, and with this in view, the base 48 is provided with the supporting arm 49. The arm in question is offset, slightly, in relation to the base 48 and is connected thereto by the curved portion 50. The arm is bent so as to form what is termed a return curve, the same designating a curve not necessarily of circular contour, but one which extends through substantially 180°, and the end of this arm, which is so bent, is provided with the attaching portion 51, upon which is mounted the threaded and cylindrical lug 52. An internally threaded sleeve 53 is adapted to engage the said end 52 and securely hold the rod 54 in alinement therewith. With this type of bracket, as with the above types, it will be readily apparent that the curtain may be forced upon the return bend thereof and become wedgedly gripped between the clamping portion 55 of the supporting arm and the confronting portion of the wall or support to which the bracket is secured.

A somewhat different form of connection between the arm of the bracket and adjacent end of the rod is illustrated in Figs. 10 and 11, in this case the base 56 being provided with the offset supporting arm 57, with the attaching end formed as a socket or sleeve 58. This socket or sleeve projects at substantially right angles to the base 56, and is adapted to receive the end 59 of the curtain rod therein. The curtain rod may be of the slide or extension type and contains the smaller indenture 60, which is adapted to receive an inwardly protruding lug 61, carried by the socket or sleeve 58. This type of extension rod is made reversible by providing the exposed end of the inner or smaller member with an external ferrule similar to that illustrated in Fig. 7, thus allowing a standard and uniform size of bracket to be utilized. The socket or sleeve 58 in connection with the curved extremity 59 of the curtain rod forms a return bend, preventing the exposure of the raw edge of the curtain or drapery, and the same may be clamped in place by forcing it over the arm 57, as previously explained.

In some instances, it is not practical to clamp the curtain between the supporting arm of the bracket and the adjacent surface of the wall or support, and in these instances the bracket, as illustrated in Fig. 12, is utilized, the same including a small clamping member 62, which is riveted or otherwise held to the offset portion 63 of the arm, and resiliently presses against the rear surface 64 of the same. With this type of bracket, the curtain or drapery may be moved over the clamping arm and forcibly inserted between the clamping member 62 and the adjacent member 64 of the bracket, and will be accordingly securely held in place. A somewhat similar form of clamping member is illustrated in Fig. 13, wherein the spring clamp 68 presses against the socket 66, which is employed for holding the slide or non-extensible type of pole 67, the clamping member 68 being of any suitable form embodying the requisite resiliency, and is securely attached to the supporting arm 68', which, in turn, is carried by the base 69. In this form of bracket, the clamping member 68 is adapted to engage the edge of the curtain, and prevents it from shifting along the rod or pole, all of which is accomplished without danger or likelihood of the curtain becoming torn or mutilated.

The bracket disclosed in Figs. 14 and 15 is similar to that illustrated in Fig. 10, and in addition, includes a holding or clamping member 70. This clamping member is formed by providing a slot 72 within the supporting arm 71 of the bracket, the ends of which slot are spaced a slight distance apart, so that a tongue is defined, which, when forced toward the plane of the base, as illustrated in Fig. 14, forms a clamping member between which, and the adjacent portion of the supporting arm, the curtain or drapery may be wedged, thus holding it securely in place. In some instances, the tongue 70 may be forced inwardly to such extent that it contacts with the outer surface of the wall or support to which the base 72 is secured, and in which event, the clamping member 70 co-acts with the said surface for the securement and holding of the curtains.

A somewhat further modified form of bracket is disclosed in Fig. 17, wherein the base 74 is provided with the supporting arm 75. This arm includes the front and clamping portion 76 which extends across, and is spaced a slight distance in front of, the base 74, it being connected to the edge thereof by the bent portion 77. The extremity of the arm 75 may be provided with any suitable form of attaching end for connection with the curtain rod, and in actual use the curtain is forced between the clamping portion 76 of the supporting arm and the adjacent face of the base, resulting in the crowding of the curtain therebetween and its secure holding thereby.

The brackets disclosed in Figs. 16 and 18 are adapted to hold two curtain rods and securely clamp the curtain in place thereon. The bracket illustrated in Fig. 16 is formed with the base 78, from the opposite edges of which project the supporting arms 79 and 80. The supporting arm 80 is provided with the auxiliary clamping member 81, the same being secured to the base 78, and is formed as a leaf spring, the extremity 82 of which is resiliently pressed against the adjacent face of the supporting arm. The supporting arm 79 is provided with the integral tongue or clamping member 83, of a type similar to that described in connection with the brackets of Figs. 14 and 15. The bracket illustrated in Fig. 18 is a type combining the constructions illustrated in Figs. 1 and 17, the one arm 84 including the offset and clamping portion 85, adapted to clamp a curtain between the same and the adjacent surface of the wall or support to which the base 86 is secured, and the other of the supporting arms 87 projecting across and spaced a slight distance in front of the base 86, against which a curtain may be forcibly crowded and held.

What I claim is:—

1. An extension rod, comprising inner and outer telescoping members, the end of one of said members provided with a ferrule of a size corresponding to the end of the other of the members.

2. An article of the class described comprising supporting brackets, telescoping, hollow tubes of non-circular contour in cross-section, the height being materially greater than the width thereof, the body portion of each of said tubes formed of a single piece of metal bent with the edges thereof contacting and forming a seam extending along the rear or back surfaces of said tubes.

3. An article of the class described comprising interfitting telescoping members, the end of one of said members provided with a ferrule of a size corresponding to the end of the other member, and brackets provided with ends of a uniform size adapted to receive and reversibly engage the ends of said telescoping members.

4. A curtain rod bracket comprising a supporting base, a supporting arm carried thereby, a portion of said arm offset from the plane of the base a relatively small distance approximately equal to the thickness of a curtain and extending parallel to the plane of said base and adapted to operate, in connection with the supporting surface upon which the base is mounted, as a clamp, said bracket adapted to receive and support a curtain rod.

5. In combination, a pair of spaced brackets formed with base plates, an arm extending from each of said base plates projecting in opposite directions and offset from said base plates a relatively small distance, approximating the thickness of a curtain, and a curtain rod relatively longer than the spacing of said base plates and provided with curved ends engaging the arms of said brackets and forming in connection therewith, return loops.

Signed at Waterville, in the county of New Haven and State of Connecticut, this 30th day of June, A. D. 1915.

CHRISTIAN F. LAUN.

Witnesses:
 JAS. E. CAVANAGH,
 E. NELSON CANFIELD.